United States Patent
Shevchenko et al.

(10) Patent No.: US 10,461,790 B2
(45) Date of Patent: Oct. 29, 2019

(54) METHOD FOR COMPENSATION OF PHASE NOISE EFFECT ON DATA TRANSMISSION IN RADIO CHANNEL

(71) Applicant: LIMITED LIABILITY COMPANY "RADIO GIGABIT", Nizhny Novgorod (RU)

(72) Inventors: Andrey Arkadievich Shevchenko, Nizhniy Novgorod (RU); Alexey Fedorovich Klyuev, pos. Druzhba (RU); Mikhail Vyacheslavovich Panteleev, Nizhny Novgorod (RU); Roman Olegovich Maslennikov, Nizhniy Novgorod (RU); Alexey Andreevich Artemenko, Nizhniy Novgorod (RU)

(73) Assignee: LIMITED LIABILITY COMPANY "RADIO GIGABIT", Nizhny Novgorod (RU)

( * ) Notice: Subject to any disclaimer, the term of this patent is extended or adjusted under 35 U.S.C. 154(b) by 0 days.

(21) Appl. No.: 16/272,498

(22) Filed: Feb. 11, 2019

(65) Prior Publication Data
US 2019/0245569 A1  Aug. 8, 2019

Related U.S. Application Data

(63) Continuation of application No. PCT/RU2017/050072, filed on Aug. 7, 2017.

(30) Foreign Application Priority Data

Aug. 10, 2016 (RU) ................. 2016133024

(51) Int. Cl.
*H04B 17/336* (2015.01)
*H04B 1/10* (2006.01)
(Continued)

(52) U.S. Cl.
CPC ......... *H04B 1/1027* (2013.01); *H04B 17/336* (2015.01); *H04L 27/0014* (2013.01);
(Continued)

(58) Field of Classification Search
CPC ............. H04L 27/0014; H04L 27/2695; H04L 27/2675; H04L 27/2647; H04L 5/0048;
(Continued)

(56) References Cited

U.S. PATENT DOCUMENTS

| | | | |
|---|---|---|---|
| 7,409,024 | B2 | 8/2008 | Ginesi et al. |
| 7,733,993 | B2 | 6/2010 | Lindh |

(Continued)

FOREIGN PATENT DOCUMENTS

| | | |
|---|---|---|
| RU | 2502196 C1 | 12/2013 |
| WO | 2016/067675 A1 | 5/2016 |

OTHER PUBLICATIONS

International Search Report with regard to PCT/RU2017/050072 dated Nov. 16, 2017.

*Primary Examiner* — Rahel Guarino
(74) *Attorney, Agent, or Firm* — BCF LLP

(57) ABSTRACT

The present invention generally relates to the field of electrical communication and more specifically to apparatuses and methods of phase noise mitigation for signal transmission in wideband telecommunication systems.

The method for compensation of the phase noise effect on the data transmission through a radio channel is based on a possibility to present the phase noise of a reference oscillator like a random process where the main spectral density is concentrated in the low-frequency region. Therefore, the number of estimated parameters can be reduced many times to several low-frequency spectral components instead of a direct estimation in the time domain.

(Continued)

The advantage of the method is an improvement of the estimation accuracy and a reduction of the computational complexity.

14 Claims, 5 Drawing Sheets

(51) Int. Cl.
*H04L 27/00* (2006.01)
*H04L 27/26* (2006.01)

(52) U.S. Cl.
CPC ...... *H04L 27/2657* (2013.01); *H04L 27/2695* (2013.01); *H04L 2027/0067* (2013.01)

(58) Field of Classification Search
CPC ......... H04L 2027/0067; H04L 27/2634; H04L 27/2636; H04L 27/265; H04L 27/2657; H04B 17/336; H04B 1/1027; H03B 2200/009
See application file for complete search history.

(56) References Cited

U.S. PATENT DOCUMENTS

| | | |
|---|---|---|
| 8,085,751 B2 | 12/2011 | Oh et al. |
| 9,036,747 B2 | 5/2015 | Chiang et al. |
| 9,160,382 B2 | 10/2015 | Wu et al. |
| 9,258,107 B1 | 2/2016 | Warke et al. |
| 2009/0110112 A1* | 4/2009 | Wilhelmsson ........ H04L 5/0048 375/296 |

\* cited by examiner

METHOD FOR COMPENSATION OF PHASE NOISE EFFECT ON DATA TRANSMISSION IN RADIO CHANNEL

CROSS-REFERENCE

The present application is a Continuation of PCT/RU2017/050072, filed on Aug. 7, 2017, entitled "METHOD OF COMPENSATING FOR THE EFFECT OF PHASE NOISE ON DATA TRANSMISSION OVER A RADIO-FREQUENCY CHANNEL", which claims convention priority to Russian Patent Application 2016133024, filed on Aug. 10, 2016, the entirety of which is incorporated herein by reference.

FIELD OF THE INVENTION

The present invention generally relates to the field of electrical communication and more specifically to apparatuses and methods of phase noise mitigation for signal transmission in broadband telecommunication systems.

BACKGROUND OF THE INVENTION

The phase noise is an inherent characteristic of any signal generator which consists in a random uncontrolled variation of a generated signal phase in time. In the case of a communication system the phase noise of the reference oscillators at the transmitter and receiver sides leads to uncontrolled changes in the received signal phase in time which has to be estimated and compensated to provide reliable and valid reception of the transmitted data.

The phase noise is typically significant in oscillators based on semiconductor integrated circuits that are widely applied in modern wireless systems due to their low cost, small size and low power consumption. Wherein a phase noise level is higher for high frequency oscillators, e.g. for 60-90 GHz millimeter-wave band communication systems demonstrating an increasing growth of usage.

A basic scheme of data transmission in a wireless communication network is a single carrier scheme where information bits are transmitted with their modulation to time-domain signal symbols. A general scheme of a digital communication system with a single carrier is presented in FIG. 1. An information message in such scheme is encoded and modulated in the time domain via the digital signal processing. Then the signal samples are transformed to an analog baseband signal by a Digital-to-Analog Convertor (DAC) whereupon the baseband signal is moved to the carrier frequency, passed through a power amplifier and supplied to a transmitter antenna. At the receiver side the passband signal that is passed through the wireless channel arrives at a low-noise amplifier (LNA) and is transformed to a baseband signal using a backward frequency transfer. The baseband signal samples are converted to the digital form by an Analog-to-Digital Converter (ADC) for further digital signal processing at the receiver. The digital part of the receiver performs time and frequency synchronization of the received signal, channel equalization (elimination of channel linear distortions), phase noise estimation and compensation and data decoding based on the output of a digital demodulator. A traditional approach to phase noise mitigation at the receiver in such systems consists in application of a Phase-Lock-Loop (PLL) scheme performing phase noise suppression with a feedback loop including the following operations: signal demodulation, i.e. estimation of a phase noise sample for the symbol being demodulated, low-pass filtering of the phase noise samples, and application of the filtered phase noise estimates for phase error compensation at next symbols of the received signal. The phase error compensation can be done both after (FIG. 1) and before the signal equalization (FIG. 2).

The described traditional method of the phase noise compensation in single carrier communication systems requires phase noise estimation for each transmitted symbol (using data symbols and a decision-directed approach based on the demodulator output) or for a significant part of the symbols (using pilot symbols in the transmitted signal) for its efficient operation.

Besides, using phase information obtained from the demodulated data may typically be insufficiently reliable (i.e. the phase estimates may contain a sufficiently high level of errors) and the pilot samples known to the receiver may stand apart from each other by a significant number of signal samples. For example, insertion of pilot signals only to form guard cyclic prefixes is common in Single Carrier systems with Frequency Domain Equalization (SC-FDE). This modulation type assumes block data transmission and is similar to Orthogonal Frequency Division Multiplexing (OFDM). The SC-FDE modulation type is widespread in modern wireless communication systems.

For the indicated case of a sufficient time interval between the pilot signals the phase error estimation can be done using the known pilot signals and then the phase errors can be approximated for signal samples carrying the data using a constant or linear interpolation. However, such phase noise estimation may be not enough accurate, since the phase noise realization can significantly deviate from a constant value or a linear trend. Therefore, there is a need for a more accurate method for estimation and approximation of the phase noise realizations between the values estimated from the pilot signals. In particular, values of the phase noise realization at different signal samples are not independent but are correlated in time that can be used to improve an estimation accuracy.

A method for reduction of phase noise impact on a quality of received signal in single carrier systems is disclosed in U.S. Pat. No. 7,409,024 "Process for providing a pilot aided phase synchronization of carrier" published Aug. 5, 2008. A general structure of the apparatus disclosed in the patent is presented in FIG. 3. The method proposed in the patent includes estimation of phase distortions at pilot sample blocks of the equalized signal using a procedure of the Weinner filtering of phase errors, calculation of phase errors for the data samples with the linear interpolation of phase error estimates from the two neighboring pilot blocks and phase noise compensation with the calculated values. A drawback of the proposed method consists in a fact that the Werner filtering procedure relying on the phase noise correlation properties is efficiently used only to improve the phase noise estimation for the pilot samples and is not applied to the phase error estimation for the data samples located between the pilot samples. Efficiency of the method disclosed in the patent applied to the data samples is comparable with the performance of the previously considered linear interpolation scheme because in both cases essentially the same algorithm is used which does not provide tracking of significant deviations of the noise from the linear trend between the groups of pilot samples of a single block.

The prior art includes another technical solution presented in U.S. Pat. No. 7,733,993 "High speed gain and phase recovery in presence of phase noise" and providing a method of phase noise compensation in OFDM systems. The method disclosed in the patent assumes estimation of subcarrier phase distortions for an OFDM block in the frequency domain based on knowledge of pilot samples and application of hard decisions for the data subcarriers, conversion of phase error estimates from the frequency domain to the time domain via the Discrete Fourier Transformation (DFT) and smoothing of the obtained estimates via the Kalman filtering (FIG. 4). However, the presented method is not applicable in the single carrier systems because it uses specific properties of the OFDM systems, namely, it performs estimation of phase noise spectral components in the frequency domain based on knowledge of the pilot samples and making hard decisions for the data symbols which is impossible in the single carrier systems with the transmitted signal being formed in the time domain.

The prior-art also includes a phase noise mitigation method for single carrier data transmission systems disclosed in U.S. Pat. No. 9,160,382 "Phase noise mitigation for wireless communications". The method described in the patent is considered as a prototype of the present invention. It assumes estimation of phase noise distortions for each sample of the received signal based on knowledge of the pilot samples and usage of hard decisions for the data symbols, filtering of the estimated phase errors for each sample using the Joint Forward Backward Linear Prediction Filter (JFBLPF) and compensation of the phase noise by the filtered smoothed sequence of the phase errors. In order to improve the phase noise compensation efficiency, iterative execution of the method is additionally proposed to get more accurate estimates of the phase distortions for the data signal samples. A general scheme of a receiver using an apparatus described in U.S. Pat. No. 9,160,382 is presented in FIG. 5 and the apparatus that implements the method disclosed in the patent is represented in FIG. 6. Drawbacks of the method include high computational complexity of its implementation requiring inversion of large matrices which is prohibitive for application in most of practical wireless communication systems. It should also be noted that the method uses statistical characteristics of the phase noise to improve accuracy of estimation of its realization. However, these characteristics are preliminary estimated from the same set of data which worsens the accuracy of the phase noise estimation and compensation. At the same time such statistical characteristics are a priori known for most of generators used in radio communication systems e.g. in the form of the phase noise power spectral density or the equivalent phase noise spectrum bandwidth and can be taken into account within the estimation process.

Thus, there is a necessity for a method of phase noise estimation and compensation in wireless communication systems where pilot signals (or groups of pilot signals) known to the receiver are separated by sufficient time intervals, so that a realization of the phase noise cannot be accurately approximated by a constant or a linear trend. At the same time a priori known statistical characteristics of reference oscillators should be used for the phase noise estimation and estimation accuracy improvement, for example, the power spectral density of the phase noise or its derivative characteristics. This method of the phase noise suppression should have a relatively low computational complexity compared to analogs from the prior art that can provide a possibility of its implementation in FPGA or ASIC with limited hardware resources.

SUMMARY OF THE INVENTION

A purpose of the present invention is to develop an efficient method for phase noise estimation and compensation in the received signal for applications in modern single carrier wideband communication systems.

The developed method consists in estimation of a phase noise realization from a sequence of several symbols of the received signal using a priori known statistical characteristics of the reference oscillator and in compensation of the phase distortions for a sequence of multiple symbols of the signal with the obtained phase noise estimate.

The advantage of the developed method is, on one hand, an improvement of the estimation accuracy compared to known methods used in single carrier systems and, on the other hand, a reduction of the computational complexity. The latter result is provided by independence of the computational complexity of the length of the sequence of signal samples used for the phase noise estimation, in contrast to similar methods known from the prior art.

The advantage is achieved due to estimation of the frequency domain phase noise characteristics instead of the time domain characteristics which is based on a direct estimation of the phase distortions in a sequence of several received signal samples from the total set of samples of the received signal. As it is known from the prior art, most of the phase noise power produced by a reference oscillator is concentrated in the low frequency region, therefore, a relatively low number of the spectrum components is to be estimated to achieve a sufficient estimation accuracy. This number is independent of the number of signal samples used for the estimation. Calculation of the required low-frequency phase noise spectrum characteristics from a sequence of signal samples is performed via a linear combination of the phase noise estimates with weighted coefficients. The estimated values of the spectral components are further used for calculation of a phase noise estimate for a sequence of multiple signal samples in the time domain by the inverse Fourier transform.

Therefore, a method for estimation and compensation of the phase noise effect on the data transmission has been developed and includes the following steps: (a) reception of a sequence of multiple signal samples; (b) estimation of the phase noise in the sequence of multiple signal samples; (c) compensation of the phase noise in the sequence of multiple signal samples using the phase noise estimate wherein the procedure of phase noise estimation comprises the following successive steps: (b1) selection of a sequence of several signal samples from a variety of signal samples; (b2) direct estimation of a phase noise realization in the sequence of several signal samples; (b3) generation of a sequence of estimates of the phase noise realization; (b4) estimation and extraction of one or several phase noise low-frequency spectral components by a linear combination of the phase noise realization estimates with weighted coefficients; (b5) estimation of the phase noise in a sequence of multiple samples in the time domain using the inverse Fourier transform of the estimated low-frequency phase noise components.

In one embodiment of the method, the number of estimated spectral components is selected a priori to cover the phase noise spectrum of the used signal generators at a specified level which is determined according to parameters of the data transmission and characteristics of the reference oscillator.

In another embodiment of the method, pilot signals a priori known to the receiver are used for direct estimation of the phase noise realization. The pilot-only-based estimation of the phase noise is the most efficient solution for the data transmission in a condition of a high level of noise in the received signal when a correct demodulation of the data symbols is impossible.

In another embodiment of the method, the received and demodulated data symbols are used for a direct estimation of the phase noise realization. This allows to increase the number of estimates of the phase noise realization and, as a result, to improve the phase noise estimation for the entire signal when the noise level allows a correct demodulation for the majority of the data samples.

In one more embodiment of the method, a combination of the pilot signals a priori known to the receiver and received and demodulated data samples are used for a direct estimation of the phase noise realization. In this case the phase error detection can be performed in a wide range of the signal-to-noise ratios, on one hand, providing a reliable estimation due to selection of only the pilot samples in the high noise conditions and, on the other hand, increasing the number of the time-domain phase noise estimates in the case of correct demodulation for the majority of the data samples. Making decisions on usage of the phase noise estimates from the data samples can be based on a measured signal-to-noise ratio of the received signal.

In one more embodiment of the method, the Fast Fourier Transform (FFT) is used for estimation of the phase noise spectral components. This transform is a special case of a linear combination of the estimates of the phase noise with weighted coefficients. This approach can be used in absence of a priori information about the correlation properties of the spectral components of the reference oscillator phase noise. This embodiment is more universal but demonstrates lower phase noise suppression efficiency compared to other possible embodiments of the proposed method.

In another embodiment, a method operating according to the minimum mean square error (MMSE) criterion is used for estimation of the phase noise spectral components. The estimation accuracy is improved in this embodiment due to usage of additional a priori information about the statistical characteristics of the reference oscillator. In particular, autocorrelation properties of the phase noise spectral components are taken into account.

In particular embodiments of the method, the phase noise is preliminarily estimated and compensated via a linear interpolation of the phase noise values between samples or groups of samples of the pilot signals a priori known to the receiver. Correctness of the phase noise estimation from the demodulated data signals is improved in that case and the method becomes applicable at a lower level of the signal-to-noise ratio.

In another embodiment of the method, the mean value of the phase noise calculated via averaging of phase noise values over samples of the pilot signals a priori known to the receiver is preliminarily estimated and compensated. This approach also improves the phase noise estimation of the demodulated data of the received signal and has the lowest complexity among the available methods for the preliminary phase noise compensation as far as all samples are compensated with a single value.

In one more embodiment of the method, the phase noise estimation and compensation are performed before the received signal equalization. This approach is efficient in the case of the frequency-domain equalization because a level of the inter-carrier interference due to a loss of the orthogonality of the equalized signal spectral components is low in that case. However, the inter-symbol interference of the received signal leads to a degradation of the phase error estimation accuracy. In most of the cases, this estimation can be made only from the pilot signal samples because demodulation of the data symbols would lead to a large number of errors.

In another particular embodiment, the phase noise estimation and compensation are performed after the received signal equalization. An advantage of this approach consists in a possibility to perform the phase noise estimation from all signal samples using both the known pilot samples and the demodulated data symbols and it increases the accuracy of the spectral component estimation and phase noise compensation efficiency for the entire signal.

In an embodiment of the method, a block modulation with a single carrier and frequency domain equalization is used for the signal transmission. This embodiment is applicable in modern wireless communication systems such as IEEE 802.11ad, LTE and many other cases with the SC-FDE modulation. In this embodiment a length of the set of signal samples used for the phase noise estimation and compensation is a multiple of the signal modulation block length. This approach also optimizes the computational complexity.

BRIEF DESCRIPTION OF THE DRAWINGS

Further features and advantages of the present invention will become apparent from the following description of the preferred embodiments with reference to accompanying drawings.

Figure 1:
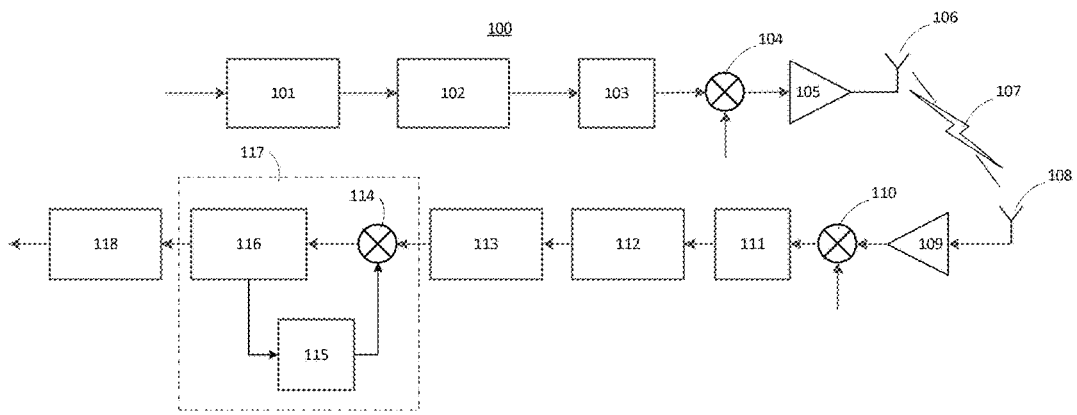
FIG. 1—a top level diagram of a single carrier communication system with the traditional PLL-based phase noise estimation and compensation method applied to the equalized signal (prior art).
Figure 2:
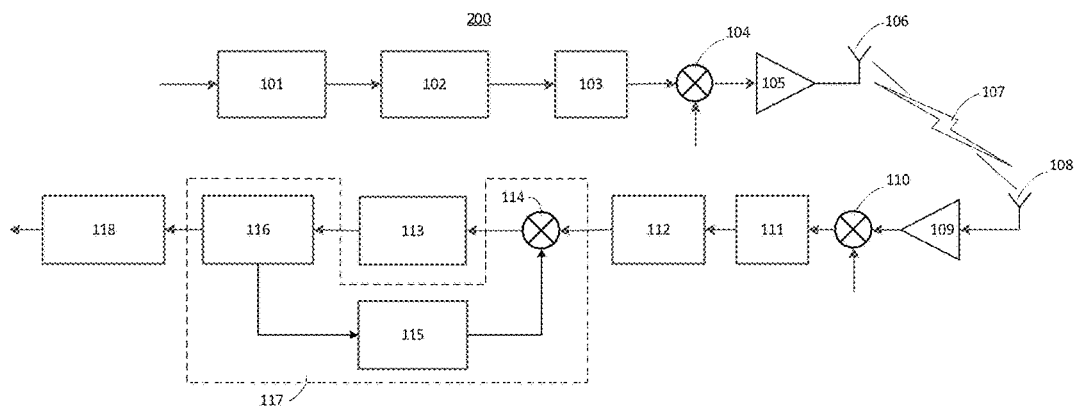
FIG. 2—a top level diagram of a single carrier communication system with the traditional PLL-based phase noise estimation and compensation method applied to the pre-equalized signal (prior art).
Figure 3:
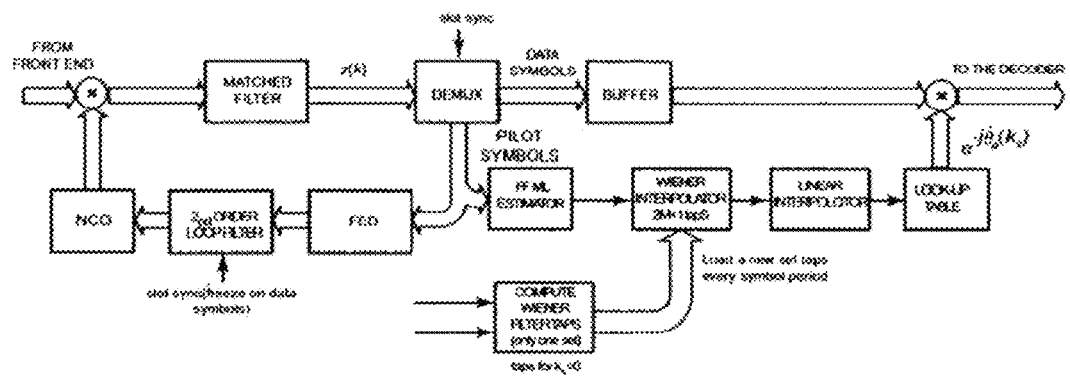
FIG. 3—a structure of the phase noise compensation apparatus disclosed in U.S. Pat. No. 7,409,024 (prior art).
Figure 4:
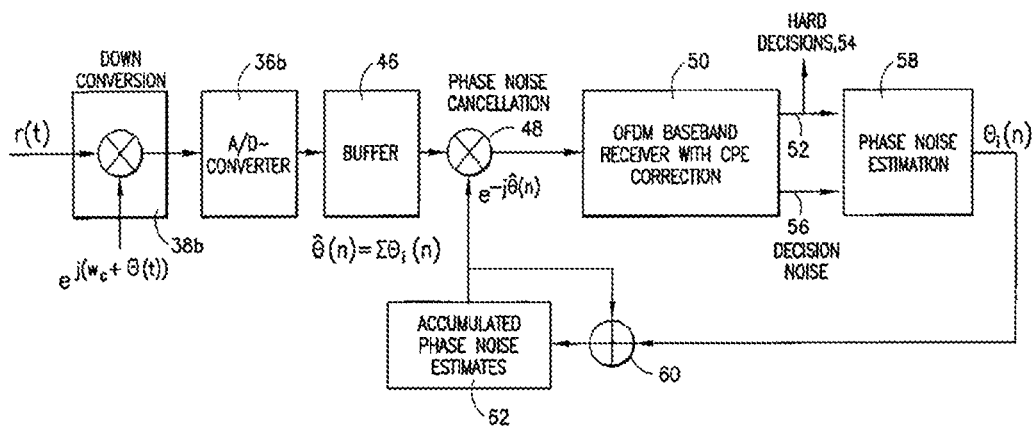
FIG. 4—a structure of the phase noise compensation apparatus disclosed in U.S. Pat. No. 7,733,993 (prior art).
Figure 5:
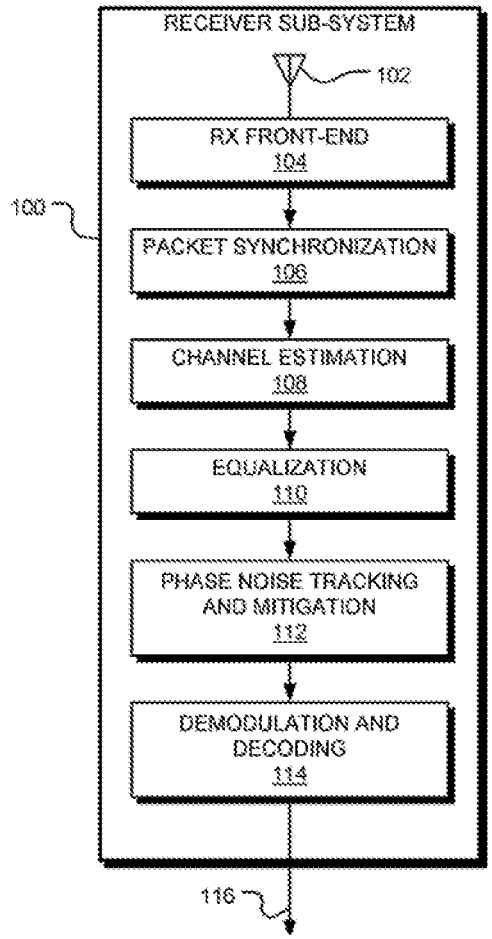
FIG. 5—an overall structure of a receiver including the phase noise compensation apparatus disclosed in U.S. Pat. No. 9,160,382 (prior art).
Figure 6:
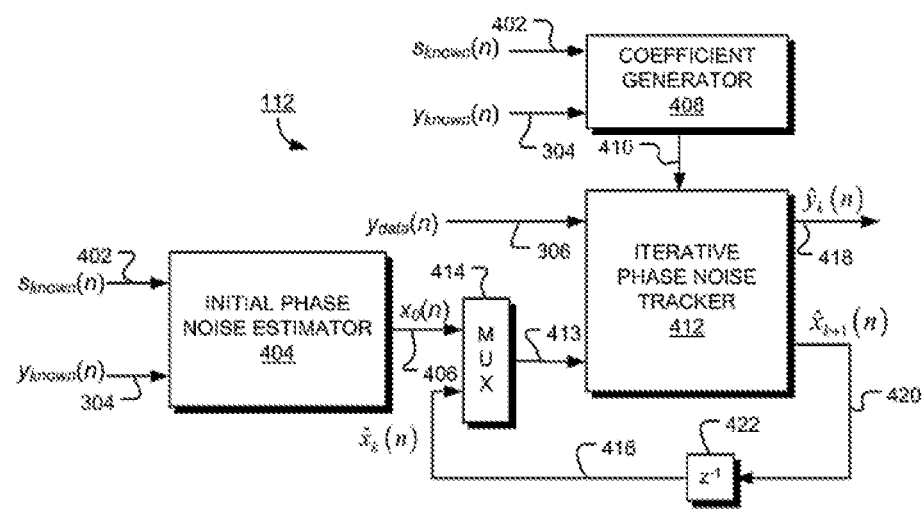
FIG. 6—a general scheme of the phase noise compensation apparatus disclosed in U.S. Pat. No. 9,160,382 (prior art).

The following reference numerals are used in the figures:

100—a single carrier communication system
101—a forward error correction encoder,
102—a digital modulator,
103—a digital-to-analog convertor,
104—a transmitter mixer,
105—a power amplifier,
106—a transmitter antenna,
107—a radio channel,
108—a receiver antenna,
109—a low-noise amplifier,
110—a receiver mixer,
111—an analog-to-digital converter,
112—a frequency and time synchronization module,
113—an equalizer,
114—a phase errors compensator,
115—a digital demodulator,
116—a low-pass filter,
117—a phase-locked loop,
118—a forward error correction decoder,
200—a single carrier communication system,
300—a single carrier receiver,
301—a frequency and time synchronization module,
302—an equalizer,
303—a phase noise estimation and compensation module,
304—a demodulator,
305—a decoder,
400—a single carrier receiver,
500—a phase noise estimation and compensation module,
501—a signal delay line,
502—a phase error detector,
503—a phase noise spectral components estimator,
504—an inverse Fourier Transform module,
505—a phase error compensator,
600—a phase noise estimation and compensation apparatus,
601—a signal delay line,
602—a preliminary phase noise estimator,
603—a preliminary phase noise compensator,
604—a phase error detector,
605—a phase noise spectral components estimator,
606—an inverse Fourier Transform module,
607—a signal delay line,
608—a phase error compensator

DETAILED DESCRIPTION OF THE INVENTION

The present invention proposes a method for phase noise suppression in the received signal for data transmission in wireless communication systems which is characterized by a better efficiency and a lower computational complexity in comparison with known methods based on a linear interpolation or phase error averaging.

The method is based on a possibility to present the phase noise of a reference oscillator like a random process where the main spectral density is concentrated in the low-frequency region. Therefore, due to estimation of a phase noise as several samples of the received signal in the frequency domain instead of the time domain, the number of estimated parameters can be reduced many times to several low-frequency spectral components instead of a direct estimation of the time domain realization.

For a detailed description of the developed method, a mathematical model of the data transmission is considered where a signal s0(n) generated at the transmitter propagates through a channel with the additive white Gaussian noise ω(n) (AWGN) and is received at the receiver in presence of a phase noise of the reference oscillator φ(n), which causes phase changes for each received signal sample:

$$x(n)=s(n)\cdot\exp[j\varphi(n)]+\omega(n) \quad (1)$$

The main goal of efficient phase noise suppression is to obtain the most accurate estimate of the time domain realization of φ(n) for each sample of the signal and to apply the obtained estimate for compensation of the received signal phase distortions. In the claimed invention estimation of the phase noise is provided by several samples constituting a subset with the length of N from the total number L of signal samples, observed at the receiver (N≤L). In the general case, selection of the signal samples for the phase noise estimation by the proposed method can be done arbitrarily so it is not necessary to select all values of the observed signal or sampling with any period. Let the indices of the signal samples that are included into the subset of samples form a set of $I_n=\{i, i \in [0, L-1]\}$ with the power of N. Then, the values included into the subset of samples of the received signal and can be represented in a vector form as:

$$x=S\Phi+\Omega \quad (2)$$

where $X=[\{x(m), m \in I_n\}]^T$ is a vector of the received signal samples included into the current subset, $\Phi[\{e^{j\varphi(m)}, m \in I_n\}]^T$ is a vector of a phase noise time domain realization, $\Omega=[\{\omega(m), m \in I_n\}]^T$ is a vector of Gaussian noise samples, $S=\text{diag}[\{s(m), m \in I_n\}]^T)$ is a diagonal matrix in which nonzero elements of the main diagonal correspond to the transmitted signal samples from the subset.

A frequency characteristic of the phase noise can be calculated from a subset of N samples of the entire phase noise realization of L signal samples. It is provided by the discrete Fourier transform (DFT) of the samples of the phase noise realization in the time domain corresponding to the signal elements and included into the subset:

$$J(k) = \sum_{n \in I_n} e^{j\cdot\phi(n)} \cdot e^{j\frac{2\pi nk}{L}}, k \in [0, L-1] \quad (3)$$

$$J = F\Phi,$$

where $J=[J(0) \ldots J(L-1)]$ is a vector of the phase noise spectral characteristic for the entire observed signal, F is an L×N shortened DFT matrix containing only the columns of the DFT matrix corresponding to the indices of the signal samples from the subset $I_n$.

In a vector form the frequency response of the phase noise realization for the entire observed signal can be represented as a sum of two components:

$$J=J_u+J_{-u} \quad (4)$$

where $J_u=[J(0) \ldots J(W/2-1), 0, \ldots 0, J(L-W/2), J(L-1)]^T$ is a vector of low-frequency spectral components of the phase noise realization, and $J_{-u}=[0, \ldots 0, J(W/2), J(L-W/2-1), 0 \ldots 0]^T$ is a vector of high-frequency spectral components of the phase noise realization.

Due to the low-frequency nature of the phase noise, estimation of its spectral characteristics is provided by determining only the values of the vector Ju, and the vector J-u can be assumed equal to zero. The number of the estimated spectral components of the phase noise W (the length of the vector Ju) is chosen to cover the phase noise spectrum at a certain level. Characteristics of the phase noise power spectral density can be determined according to characteristics of the reference oscillator.

The number of low-frequency spectral components W covering the required spectral region of the phase noise depends on a ratio of a duration of the subset of N samples of the signal to the received signal sample period. However, in most of the practical implementations the number W is chosen to be equal to 3, 5, 7.

Estimation of the phase noise spectral components for the entire signal includes phase error detection from each sample of the subset of the received signal samples and forming a sequence of estimates of a time domain phase noise realization Y for the considered subset X, which is defined as:

$$Y=(S)^{-1} \cdot X=F^H \cdot J_u + F^H \cdot J_{-u} + (S)^{-1}\Omega \quad (5)$$

Phase errors for each sample from the subset are calculated by dividing the received signal by the complex values of the transmitted signal samples (the diagonal elements of the matrix S). The transmitted signal samples can be determined both on a basis of a priori knowledge of pilot samples in the transmitted signal and from the received signal data samples by making hard decisions in the demodulator which consists in approximation of the received signal symbols by the signal constellation values situated at the shortest Euclidean distance. Phase error estimation of the data samples may be inaccurate due to demodulation errors leading to a degradation of the described method, however, this effect may be neglected for the purposes of the present description.

Expression (5) can be reduced to the form:

$$Y=F^H \cdot J_u + E, \quad (6)$$

where E is a modified additive Gaussian noise that includes the receiver Gaussian noise and the phase noise spectral components $J_u$, excluded from the further estimation.

$$E=F^H \cdot J_{-u} + (S)^{-1}\Omega \quad (7)$$

Estimates of non-zero vector elements of the phase noise spectral components $J_u$ can be calculated by filtering the sequence of estimates of the phase noise realization Y:

$$\hat{J}_u = M \cdot Y, \quad (8)$$

where M is a matrix of the phase noise spectral characteristics estimation with the size of W×N. $\hat{J}_u = [\hat{J}(0) \ldots \hat{J}(W/2-1), \hat{J}(L-W/2), \ldots \hat{J}(L/2)]$ is a vector of estimated spectral components including only W nonzero elements of the vector $J_u$.

In one embodiment, estimates of the first W phase noise spectral components can be calculated by the Fourier transform from all N samples of the subset. In that case, the filtering matrix M has the size of W×N and is formed by rows of columns of the Fourier matrix F of the size of L×L, corresponding to the estimated spectral components and indices of the signal samples $I_n$ included into the subset. This approach is the simplest way to calculate the required values but it does not consider autocorrelation properties of the phase noise spectral components and additionally requires the phase noise sampling to be periodical.

In another embodiment, the criterion of minimum mean square error (MMSE) is used for calculation of elements of the filtering matrix M according to the equation:

$$M=R_{J_u J_u} \cdot \overline{F}(\overline{F}^H \cdot R_{J_u J_u} \cdot \overline{F} + R_{\epsilon\epsilon})^{-1}, \quad (9)$$

where $R_{J_u J_u}$ is a correlation matrix of W low-frequency phase noise spectral components, whose elements depend on characteristics of the carrier frequency reference oscillator, $R_{\epsilon\epsilon}$ is a correlation matrix of residual noises, $\overline{F}$ is a Fourier matrix with the size of W×N for calculation of W low-frequency phase noise spectral components from the signal samples of the subset and is formed as $\overline{F}=\{f_{j,J}\}$, where $f_{j,J}$ is an element of the Fourier matrix F with the size of L×L such that $j \in [0, W-1]$, $i \in I_n$. Estimation of the phase noise spectral components in this embodiment gives more optimal result compared to the estimation based on the Fourier transform, however, it requires an additional a priori knowledge of statistical characteristics of the estimated noise.

An estimate of the time domain phase noise realization for all L samples of the received signal further used for the phase noise compensation can be calculated as an inverse discrete Fourier transform with the dimensions of W×L from estimates of the phase noise spectral components $\hat{J}_u$:

$$\Phi(n) = \frac{1}{2N}\left(\sum_{k=0}^{W/2-1} \hat{J}_u(k) \cdot e^{-j\frac{2\pi n k}{L}} + \sum_{k=L-W/2}^{L-1} \hat{J}_u\left(k-L+\frac{W}{2}\right) \cdot e^{-j\frac{2\pi n k}{L}}\right) \quad (10)$$

Thus, a method of phase noise compensation in a received signal based on estimation of the spectral components presented in this invention comprises the following steps:

1. Selection of a sequence of N signal samples S from a variety of L received signal samples s(n), forming a subset from which the estimation is performed;

2. Estimation of the phase noise realization Y in the sequence of N signal samples included into the current subset using knowledge of the pilot samples and the demodulated data samples;

3. Estimation of phase noise low-frequency spectral components $\hat{J}_u$ by a linear combination of the phase noise realization estimates Y with weighted filter coefficients M;

4. Calculation of an estimate of the time-domain phase noise realization for all L samples of the received signal via the inverse Fourier transform of the estimated phase noise low-frequency components $\hat{J}_u$.

5. Using this estimate for the phase noise compensation in the received signal s(n).

It should be noted that accuracy of the estimation of phase errors from the data samples strongly depends on a level of all noises in the received signal. Therefore, in order to improve the quality of the phase distortion estimation, a preliminary estimation and compensation of the phase noise for elimination of a common phase rotation of all signal samples included into the i-th subset can be additionally performed. This procedure is based on estimation of phase errors from the pilot samples of the received signal, which are known a priori. In one embodiment, a linear interpolation of the phase values between the estimates is performed to calculate the preliminary eliminated phase error for the data symbols. In another embodiment, the phase noise compensation for the data samples is performed with the average value of the phase errors calculated from the pilot samples of the signal.

Figure 7:
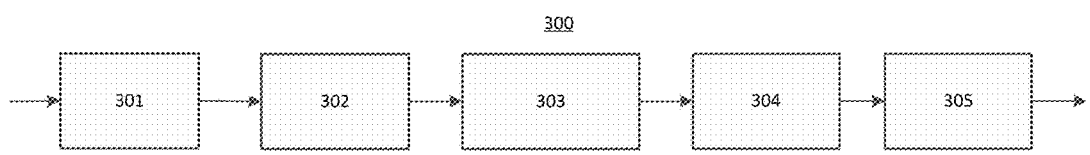
FIG. 7—a receiver functional diagram containing the phase noise estimation and compensation scheme according to the present invention being applied to the signal after the equalization.

A general scheme of an embodiment of a single carrier receiver 300 used in single-carrier communication systems containing a phase noise suppression scheme implementing the developed method is shown in FIG. 7. The functional diagram includes the following components: a frequency and time synchronization module 301, an equalizer 302, a phase noise estimation and compensation module 303 using the claimed method of phase noise suppression, a received signal demodulator 304 and a forward error correction decoder 305. In the presented embodiment of the invention, the phase noise is estimated and compensated after the received signal equalization.

Figure 8:
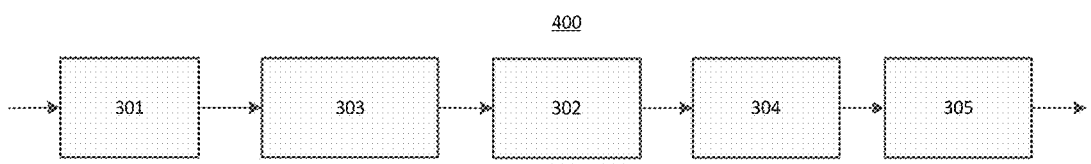
FIG. 8—a receiver functional diagram containing the phase noise estimation and compensation scheme according to the present invention being applied to the signal before the equalization FIG. 9—a functional diagram of the phase noise estimation and compensation apparatus according to one embodiment of the present invention.

A possible embodiment of the present invention is a single carrier receiver architecture 400 shown in FIG. 8, where the phase noise suppression is performed by a phase noise estimation and compensation module 303 before equalization of the received signal by a demodulator 304.

Figure 9:
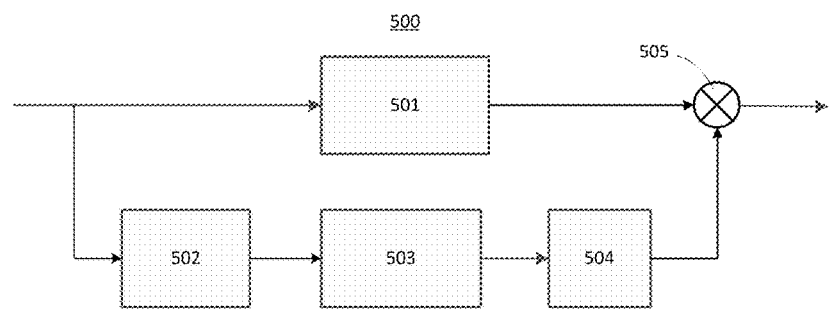

A functional diagram of an embodiment of a digital phase noise estimation and compensation module 500 using the method presented above is shown in FIG. 9. In this embodiment, the sequence of the received signal samples is fed to a phase error detector 502, which calculates estimates of phase errors either based on a priori knowledge of the pilot samples or based on results of the signal demodulation using hard decisions or combining the both approaches. Then, the obtained sequence of estimates of the time-domain phase noise realization enters a phase noise spectral components estimator 503, which calculates an estimate W of the phase noise low-frequency spectral components for the current sequence of signal samples. The resulting estimate goes to an inverse Fourier Transform module 504, where a final estimation of the time-domain phase noise realization is calculated using the inverse Fourier transform, which is used to compensate phase errors in the input signal delayed by a signal delay line 501 by the time required to perform the calculations.

Figure 10:
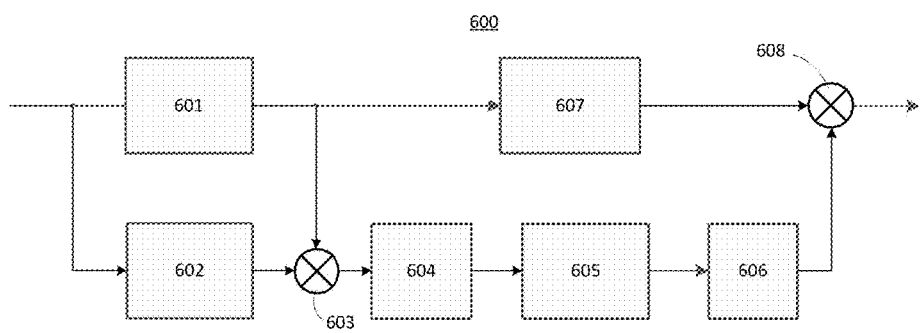
FIG. 10—a functional diagram of the phase noise estimation and compensation apparatus according to one embodiment of the present invention additionally applying the preliminary phase noise estimation and compensation scheme.

FIG. 10 provides a functional diagram of one embodiment of a phase noise estimation and compensation apparatus 600, additionally using a preliminary phase noise estimation and compensation to improve accuracy of a phase error detector 604. The pre-suppression circuit consists of a preliminary phase noise estimator 602, a preliminary phase noise compensator 603 and a signal delay line 601 for the time required to calculate the sequence used in the pre-compensation procedure. A subsequent phase noise suppression circuit is similar to the architecture applied in the phase noise estimation and compensation module 500 and uses the previously presented blocks of a phase error detector 604, a phase noise spectral components estimator 605, an inverse Fourier Transform module 606, a signal delay line 607 and a phase error compensator 608 in a sequence of the received signal samples.

Figure 11:
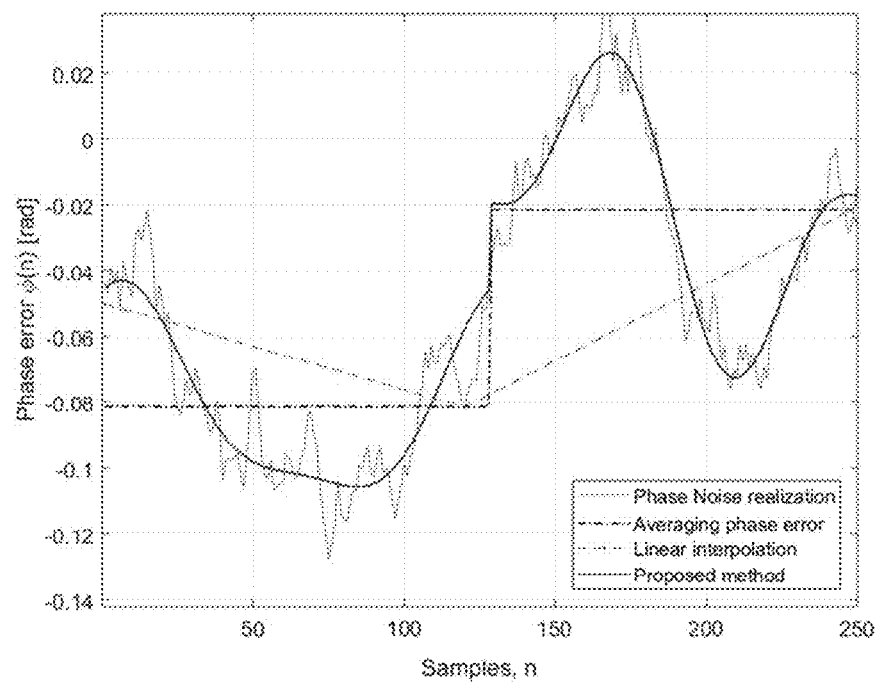
FIG. 11—an example of a time-domain phase noise realization and values of phase corrections applied to each signal sample and calculated by the linear interpolation, phase errors averaging, and the proposed method based on estimation of the spectral components.

In order to illustrate efficiency of the phase noise suppression, the proposed method was compared with the estimation and compensation schemes based on a linear interpolation and averaging of phase error estimates performed from pilot samples of the signal. FIG. 11 shows an example of a time-domain phase noise realization, as well as its estimates using the three considered methods. The phase noise realization is given for an integrated 60 GHz signal generator used in modern radio-relay communication systems. As it can be seen from the presented results, the proposed method provides a better estimation of the phase distortions for all samples of the received signal.

Figure 12:
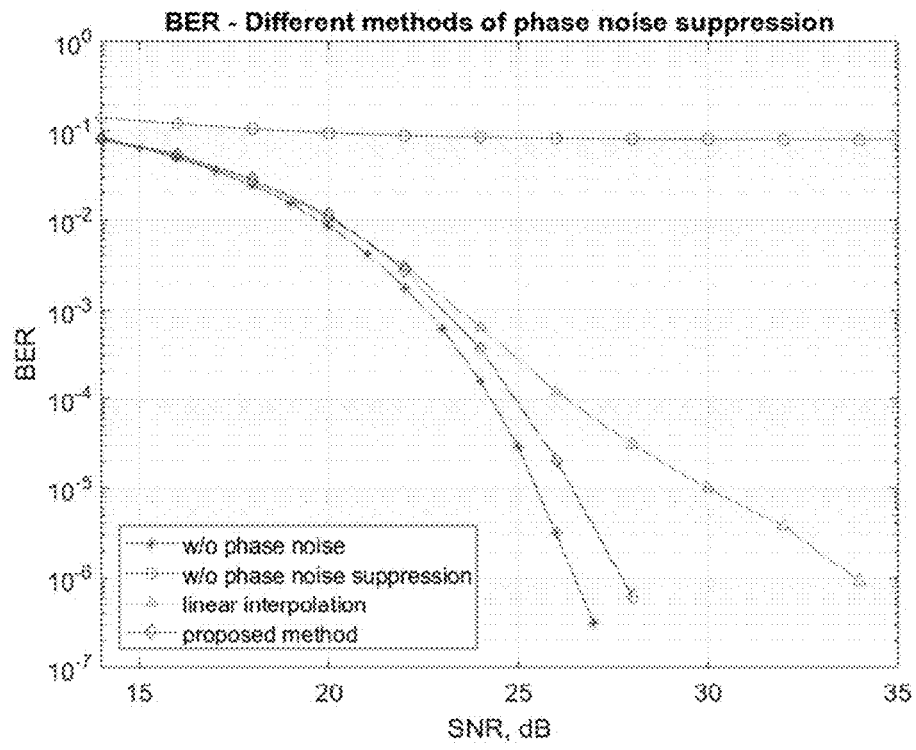
FIG. 12—a dependence of the bit error probability on the signal-to-noise ratio for the data transmission in the additive white Gaussian noise channel for different methods of phase noise suppression in the received signal.

The Bit Error Rate (BER) is one of the main characteristics of a data transmission quality in communication systems and is defined as a ratio of the number of incorrectly received bits to the total number of received bits. FIG. 12 shows an example of the impact of the phase noise on the BER value in a radio-relay communication system in the 60 GHz frequency band. The figure shows the results for three cases: no phase noise compensation for the received signal, compensation of the phase noise by the method of linear interpolation and compensation of the phase noise by the method proposed in the present invention. The presented results correspond to the case of uncoded data transmission with the 64-QAM digital modulation and demonstrate the dependence of the BER on the signal-to-noise ratio (SNR) in the channel in presence of the reference oscillator phase noise. The time-domain phase noise realization was set in the simulation according to a mathematical model of a free-running oscillator. The level of the power spectral density curve was chosen equal to −69 dBc/Hz at the 100 kHz offset from the carrier frequency. FIG. 12 additionally provides a BER curve for the case of absence of the phase noise for evaluation of the phase noise compensation efficiency for the considered methods.

As can be seen from the presented examples of different phase noise compensation methods, in the case of absence of a phase noise suppression algorithm a complete system malfunction with a constant level of BER=0.08 is observed. The usage of the phase noise compensation for the two considered methods makes possible to achieve the BER level of 10-6. The gain of using the proposed method is 6 dB in terms of SNR, which is a significant advantage of this scheme compared to the liner interpolation method. In the claimed method a degradation of the SNR operating point due to the phase noise impact on the data transmission is only 1.2 dB at the level of BER 10-6 relative to the ideal case of absence of the phase noise. It is an acceptable value for modern communication systems.

Computational complexity of the proposed method requires $W \times N$ complex multiplications and $2 \times W \times (N-1)$ additions for estimation of phase noise spectral components, as well as $W \times N$ complex multiplications and $2 \times (W-1) \times N$ additions of the multiplication results for calculation of the inverse discrete Fourier transform (DFT). The methods of phase noise estimation and compensation known from the prior art, based on the digital filtering procedure of a sequence of received signal samples, require performing $N \times N$ complex multiplications and $2 \times N \times (N-1)$ additions of the multiplication results to estimate a phase noise realization on a sequence of N symbols. Since the size of N of the sequence from which the estimation is done is much larger than the number of estimated spectral components W, the computational complexity of the known analogues significantly exceeds the complexity of the method proposed in the present invention.

The present invention is not limited to the embodiments disclosed in this description for illustrative purposes only and covers all modifications and variations that are not beyond the scope and essence of the invention as defined by the claims.

The invention claimed is:

1. A method for estimation and compensation of phase noise effect on data transmission comprising:
   a. Reception of a sequence of multiple signal samples;
   b. Estimation of phase noise in the sequence of multiple signal samples;
   c. Compensation of the phase noise in the sequence of multiple signal samples using a phase noise estimate, wherein the phase noise estimation comprises the successive steps of:
   b1. Selection of a sequence of several signal samples from a variety of signal samples;
   b2. Direct estimation of phase noise realization from the sequence of several signal samples;
   b3. Generation of a sequence of estimates of the phase noise realization;
   b4. Estimation and extraction of one or several phase noise low-frequency spectral components by a linear combination of the phase noise realization estimates with weighted coefficients;

b5. Estimation of the phase noise in a sequence of multiple signal samples in a time domain using an inverse Fourier transform of the estimated low-frequency phase noise components.

2. The method according to claim 1, wherein a number of estimated spectral components is selected a priori to cover phase noise spectrum of used signal generators at a preliminarily specified level.

3. The method according to claim 1, wherein pilot signals a priori known to a receiver are used for direct estimation of the phase noise realization.

4. The method according to claim 1, wherein received and demodulated data symbols are used for direct estimation of the phase noise realization.

5. The method according to claim 1, wherein a combination of (i) pilot signals that are a priori known to a receiver and (ii) received and demodulated data symbols is used for direct estimation of the phase noise realization.

6. The method according to claim 1, wherein a Fast Fourier Transform (FFT) is used for estimation of the phase noise spectral components.

7. The method according to claim 1, wherein a method operating according to a minimum mean square error (MMSE) criterion is used for estimation of the phase noise spectral components.

8. The method according to claim 1, wherein the phase noise is preliminarily estimated and compensated via a linear interpolation of phase noise values between samples or groups of samples of pilot signals that are a priori known to a receiver.

9. The method according to claim 1, wherein a mean value of the phase noise calculated via averaging of phase noise values over samples of a pilot signal that is a priori known to a receiver is preliminarily estimated and compensated.

10. The method according to claim 1, wherein the phase noise estimation and compensation are performed before received signal equalization.

11. The method according to claim 1, wherein the phase noise estimation and compensation are performed after received signal equalization.

12. The method according to claim 1, wherein a block modulation with a single carrier and frequency domain equalization is used for the data transmission.

13. The method according to claim 12, wherein a length of a set of signal samples used for the phase noise estimation and compensation is a multiple of a signal modulation block length.

14. The method according to claim 1, which is applied in signal processing blocks of a digital modem for a wideband radio relay communication station.

* * * * *